United States Patent Office 3,336,297
Patented Aug. 15, 1967

3,336,297
PEROXIDES AND PROCESS FOR THEIR MANUFACTURE
Michael Lederer and Harald Jensen, Frankfurt am Main, Germany, assignors to Farbwerke Hoechst Aktiengesellschaft vormals Meister Lucius & Bruning, Frankfurt am Main, Germany, a corporation of Germany
No Drawing. Filed Jan. 22, 1963, Ser. No. 253,030
Claims priority, application Germany, Jan. 25, 1962, F 35,848
15 Claims. (Cl. 260—239.3)

The present invention relates to novel peroxides and to a process for their manufacture.

It has been found that novel peroxides of the general formula

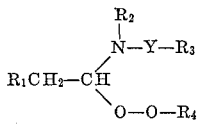

can be produced in the presence of acid catalysts or catalysts having an acid action by reacting N-vinylamides of the general formula

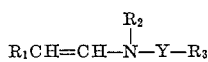

with alkyl hydroperoxides of the general formula $$R_4OOH$$

In the above formulae $R_1$, $R_2$ and $R_3$ represent straight chain or branched, saturated or unsaturated alkyl, cycloalkyl, aralkyl or aryl radicals generally having at most 12 carbon atoms and preferably at most 10 carbon atoms. From among the alkyl radicals are preferably used saturated radicals having 1–4 carbon atoms, preferred cycloalkyl radicals are those which have 5 to 6 C atoms in the ring, preferred aralyl radicals are phenylated alkyl radicals and preferred aryl radicals are radicals having one or two nuclei. The radicals $R_1$, $R_2$ and $R_3$ may be identical or different from one another and carry reaction inert substituents such as fluorine or chlorine atoms, alkoxy or nitro groups, the alkoxy groups mostly having 1–6 carbon atoms, advantageously the methoxy or ethoxy group.

$R_1$, $R_2$ and $R_3$ can stand, for example, for the methyl, ethyl, propyl, isopropyl, butyl, t-butyl, 2-ethylhexyl, dodecyl, allyl, fluoromethyl, benzyl, cyclopentyl, cyclohexyl, methylcyclohexyl, phenyl, p-tolyl, p-methoxyphenyl, o-methoxyphenyl, p-ethoxyphenyl, o-chlorophenyl, m-chlorophenyl, p-chlorophenyl and p-nitrophenyl group; $R_2$ and $R_3$ may furthermore be linked as aliphatic groups with the formation of a γ, δ, or ε-lactam ring in which a methylene group may be replaced by oxygen with the formation of a cyclic radical simultaneously containing a nitrogen atom and an oxygen atom as heteroatoms, for example an oxazolidinone radical or an isooxazolidinone radical. $R_1$ may also stand for hydrogen, this being preferred in many cases.

Y represents the oxo group

or the sulfo group —$SO_2$—. Consequently, N-vinyl carboxylic acid amides as well as N-vinyl sulfonic acid amides can be reacted with alkyl hydroperoxides according to the invention. When Y stands for the oxo group $R_2$ may represent the group —CO—R, R and $R_3$ being linked to form a cyclic dicarboxylic acid imide radical advantageously having 4–10 carbon atoms. This means that N-vinyl dicarboxylic acid imides may also be used for the reaction of the invention.

Suitable vinyl amides are, for example,

N-vinyl-N-methyl acetamide,
N-vinyl-N-ethyl acetamide,
N-vinyl-N-methyl propionic acid amide,
N-vinyl-N-ethyl propionic acid amide,
N-vinyl-N-butyl acetamide,
N-vinyl-N-ethyl butyramide,
N-vinyl-N-methyl fluoroacetamide,
N-vinyl-N-methyl octanoic acid amide,
N-vinyl-N-methyl lauric acid amide,
N-vinyl-N-benzyl acetamide,
N-vinyl-N-paratolyl acetamide,
N-vinyl-propionic acid anilide,
N-vinyl-N-methyl benzamide,
N-vinyl-N-ethyl benzamide or
N-vinyl-benzanilide.

As suitable cyclic N-vinyl amides there are mentioned by way of example

N-vinyl pyrrolidone,
N-vinyl-3-methyl-pyrrolidone,
N-vinyl-5-methyl-pyrrolidone,
N-vinyl-3-benzyl-pyrrolidone,
N-vinyl-piperidone,
N-vinyl-ε-caprolactam and the like. Suitable N-vinyl-dicarboxylic acid imides are N-vinyl-maleic acid imide,
N-vinyl-succinimide,
N-vinyl-glutaric acid imide,
N-vinyl-adipic acid imide, and
N-vinyl phthalamide.

As suitable N-vinyl sulfamides there are mentioned by way of example

N-vinyl-N-methyl-methane sulfamide,
N-vinyl-N-ethyl-methane sulfamide,
N-vinyl-N-methyl-benzene sulfamide and
N-vinyl-N-methyl-p-toluene sulfamide.

In the formulae $R_4$ represents a straight chain or branched aliphatic, alicyclic, araliphatic or heterocyclic radical, in the latter radical the hetero atom preferably being oxygen and the heterocyclic ring containing 4–5 carbon atoms and a single oxygen atom as the only hetero atom in the ring.

As hydroperoxides there may be used all hydroperoxides which are sufficiently stable under the reaction conditions. The stability augments from the primary via the secondary to the tertiary hydroperoxides so that tertiary hydroperoxides are especially suitable. In special cases, however, secondary or primary hydroperoxides may also be used. Suitable hydroperoxides are tertiary butyl hydroperoxide,
tertiary amyl hydroperoxide,
cumene hydroperoxide,
indane hydroperoxide,
pinane hydroperoxide,
tetrahydronaphthalene hydroperoxide,
1,1-dichloromethyl-propyl hydroperoxide,
cyclohexyl hydroperoxide,
isopropyl hydroperoxide,
1-methylcyclohexyl hydroperoxide,
benzyl hydroperoxide,
ethyl hydroperoxide,
para-menthane hydroperoxide,
tetrahydrofurane hydroperoxide.

In general, peroxides are used which have at most 15 carbon atoms.

As acid catalysts are used inorganic acid halides such as sulfuryl chloride, thionyl chloride, phosphorus oxychloride, as well as organic acid halides, for example acetyl chloride. Sulfoacids, especially low molecular weight aromatic sulfoacids, more particularly those of benzene or benzenes carrying alkyl groups of low molecular weight, for example benzene-sulfoacid and paratoluene sulfoacid, may likewise be used. Still further, there can be employed hydrochloric acid or Lewis acids, for example boron trifluoride, aluminum chloride, aluminum bromide and the like. The catalyst is used in a molar amount of 0.001 to 2 and preferably 0.01 to 0.5%, calculated on one mol of the N-vinyl amide used.

The N-vinyl amides are advantageously reacted with the alkyl hydroperoxides with substantial exclusion of water, in the presence or absence of inert solvents and under mild conditions. Inert solvents, which are often added for better dissipating the reaction heat, are hydrocarbons or hydrocarbon mixtures, for example petroleum ether or ligroin and ethers such as diethyl ether, diisopropyl ether, dioxane, or tetrahydrofurane.

In general, the reaction is carried out at a temperature in the range of $-100$ to $+100°$ C., preferably $-50$ to $+50°$ C.

The reaction is advantageously carried out in a manner such that the N-vinyl compound and the alkyl hydroperoxide are first introduced into the reaction vessel at the temperature defined above and the catalyst is gradually added while mechanically mixing, for example stirring. It is suitable to dilute the catalyst with an anhydrous inert solvent such as ligroin or diethyl ether. The exothermic reaction commences at once after the addition of the first drops of catalyst and is terminated after a short period of time.

The reaction products obtained are isolated by known methods as usually applied in organic chemistry. The catalyst residues can be first washed out with an alkaline solution, for example a saturated sodium bicarbonate solution. In this case the reaction mixture is suitably diluted with an inert solvent as specified above, if such a solvent has not been added in a sufficient amount before or during the reaction. The diluted reaction mixture is subsequently dried by means of a drying agent, for example sodium or magnesium sulfate, and the solvent is distilled off under reduced pressure.

The reaction products which are novel are obtained as crystals or in liquid form, are absolutely pure and have a pleasant odor. Depending on the nature of the radicals $R_1$—$R_4$ they are soluble in organic solvents and/or in water.

The nitrogen-containing peroxides obtained by the process of the invention can be used as radical donors, for example in the polymerization of unsaturated compounds, or as hardeners. With their help N-vinyl compounds, for example N-vinyl-N-alkyl acetamide, can be transformed into absolutely colorless polymers, while the use of the known peroxides as catalysts only yields colored polymerization products of the said N-vinyl compounds. When the polymerization of N-vinyl-N-methyl acetamide is carried out using as catalyst, for example the ($\alpha$-N-methyl-acetamido)-ethyl-t-butyl peroxide of Example 1 instead of a known peroxide under otherwise identical conditions, polymerization products are obtained having higher molecular weights. The products of the process of the invention are characterized by an anthelmintic action.

The following examples serve to illustrate the invention but they are not intended to limit it thereto, the parts being by weight unless otherwise stated.

*Example 1*

20 parts of N-vinyl-N-methyl acetamide and 18.4 parts of tertiary butyl hydroperoxide were filled into a round flask provided with stirrer, dropping funnel, thermometer and small drying tube and cooled to $-45°$ C. While stirring, 0.02 part of sulfuryl chloride in dry diethyl ether was slowly dropped in. In the course of the reaction the temperature rose to $-42°$ C. The reaction solution was allowed to warm up slowly. The reaction product crystallized out at a temperature in the range of $-10$ to $-20°$ C. It was taken up in ether, deacidified with ice-cold saturated sodium bicarbonate solution and dried over anhydrous sodium sulfate. After the distillation of the ether under reduced pressure 18 parts of ($\alpha$-N-methyl-acetamido)-ethyl-t-butyl peroxide of the following formula were obtained

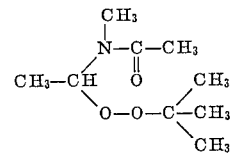

*Analysis.*—Calculated for $C_9H_{19}NO_3(189.3)$: C, 57.1; H, 10.0; N, 7.39; O active, 8.44. Found: C, 57.0; H, 10.5; N, 7.6; O active 8.3.

Molecular weight 190.5; melting point 38° C.

When the reaction was carried out in the presence of 0.1 cc. of boron trifluoride in the form of the diethyl ether complex compound at $+20°$ C., a liquid reaction product was obtained. The $\alpha$-N-methyl-acetamido-ethyl-t-butyl peroxide crystallized at $-20°$ C. It was treated with cooled ether and separated over a filter. 8 parts of peroxide were obtained having a melting point of 38° C.

*Example 2*

In the apparatus described in Example 1, 22.6 parts of N-vinyl-N-ethyl acetamide and 18.4 parts of tertiary butyl hydroperoxide were reacted at $-40°$ C. under the conditions of Example 1 with 0.04 part of sulfuryl chloride in diethyl ether. The reaction mixture was diluted with ether, the solution was deacidified, while cooled with ice, with saturated sodium bicarbonate solution and dried over sodium sulfate. The solvent was removed under reduced pressure (4 mm. of mercury at 20° C.). 31.4 parts of ($\alpha$-N-ethyl-acetamido)-ethyl-t-butyl peroxide of the following formula

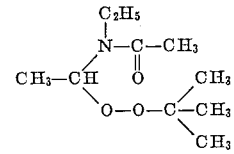

were obtained in the form of a liquid having the refractive index $n_D^{20}=1.4392$.

*Analysis.*—Calculated for $C_{10}H_{21}NO_3(203.3)$: C, 59.0; H, 10.4; N, 6.89; O active, 7.88. Found: C, 58.9; H, 10.3; N, 6.85; O active, 7.75.

Molecular weight 199.

*Example 3*

In the apparatus defined in Example 1, 22.6 parts of N-vinyl-N-methyl propionamide were reacted at $-40°$ C. with 18.4 parts of tertiary butyl hydroperoxide in the presence of 0.03 part of sulfuryl chloride in diethyl ether. The reaction product was isolated as described in Example 2. 32.8 parts of ($\alpha$-N-methylpropionamido)-ethyl-t-butyl peroxide of the following formula:

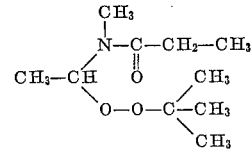

were obtained in the form of a liquid having the refractive index $n_D^{20}=1.4400$.

*Analysis.*—Calculated for $C_{10}H_{21}NO_3(203.3)$: C, 59.0; H, 10.4; N, 6.89; O active, 7.88. Found: C, 59.1; H, 10.5; N, 7.0; O active, 8.1.

Molecular weight 197.5.

Example 4

22.2 parts of N-vinyl-pyrrolidone were reacted at −10° C. with 18.4 parts of tertiary butyl hydroperoxide in the presence of 0.05 part of sulfuryl chloride in diethyl ether as described in the preceding examples. The reaction product was isolated as described above. 30.4 parts of (α-pyrrolidonyl)-ethyl-t-butyl peroxide of the formula

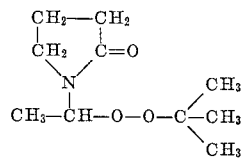

were obtained in the form of a liquid having a refractive index $n_D^{20}=1.4556$.

*Analysis.*—Calculated for $C_{10}H_{19}NO_3$(201.2): C, 59.7; H, 9.5; N, 6.97; O active, 7.95. Found: C, 59.1; H, 9.8; N, 7.2.

Molecular weight 203.

Example 5

19.8 grams of N-vinyl-N-methyl acetamide were reacted at 0° C. as described in Example 1 with 32.7 g. of cumene hydroperoxide in the presence of 0.04 g. of sulfuryl chloride in diethyl ether. The reaction product was isolated as described in Example 2. 42.7 grams of (α-N-methyl-acetamido)-ethyl-cumyl peroxide of the formula

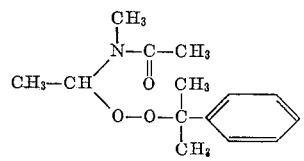

were obtained.

*Analysis.*—Calculated for $C_{14}H_{21}NO_3$(251.3): C, 67.0; H, 8.4; N, 5.57; O active, 6.38. Found: C, 67.4; H, 8.7; N, 5.45; O active, 6.14.

Molecular weight 241.

Example 6

8.1 grams of tetralyl hydroperoxide (tetrahydronaphthalene hydroperoxide) were dissolved in 20 cc. of dry diethyl ether, 5 grams of N-vinyl-N-methyl acetamide were added and 0.03 gram of sulfuryl chloride in dry ether was dropped in while stirring at +5° C. The reaction mixture was diluted with ether, the solution was extracted by shaking with saturated sodium bicarbonate solution and dried over sodium sulfate. After having removed the ether, 11 grams of (α-N-methylacetamido)-ethyl-tetralyl peroxide of the formula

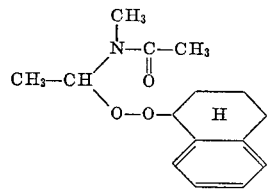

were obtained having a melting point of 59–62° C.

*Analysis.*—Calculated for $C_{15}H_{20}NO_3$(262.3): C, 68.6 H, 7.6; N, 5.34. Found: C, 68.7; H, 8.1; N, 5.65.

Example 7

As described in the preceding examples, 11.1 grams of N-vinyl-pyrrolidone and 15.2 grams of cumene hydroperoxide were reacted at +5 to +10° C. with 0.05 gram of sulfuryl chloride in dry ether. The reaction product was isolated as described in Example 2. 22.6 grams of (α-pyrrolidonyl)-ethyl cumene peroxide of the following formula

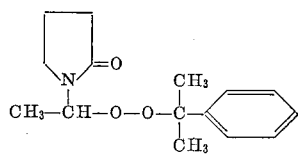

were obtained.

*Anaylsis.*—Calculated for $C_{15}H_{21}NO_3$ (263.4): C, 68.4; H, 8.1; N, 5.32; O active, 6.07. Found: C, 68.7; H, 8.3; N, 5.75; O active, 5.60.

Molecular weight 262.

Example 8

16.4 grams of tetralyl hydroperoxide were dissolved in 30 cc. of dry ether, 11.1 grams of vinyl-pyrrolidone were added and to the mixture 0.04 gram of sulfuryl chloride in dry ether was added dropwise at 5–10° C. The reaction product was isolated as described in Example 6. 18.8 grams of (α-pyrrolidonyl)-ethyl-tetralyl peroxide of the following formula

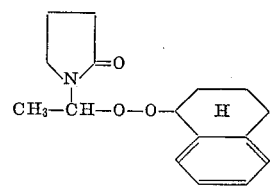

were obtained.

*Analysis.*—Calculated for $C_{16}H_{20}NO_3$ (274.4): C, 69.9; H, 8.0; N, 5.10. Found: C, 69.7; H, 7.8; N, 5.45.

Molecular weight 278; melting point 92.5–94.5° C. (from ethyl acetate/pentane).

Example 9

13.5 grams of N-vinyl-N-methyl-methane sulfamide and 9 grams of t-butyl hydroperoxide were reacted as described in Example 1 at −10° C. in the presence of 0.05 gram of sulfuryl chloride in diethyl ether. The reaction product was isolated as described in Example 2. 17.4 grams of α[N-methyl-methane-sulfamido]-ethyl t-butyl peroxide of the following formula

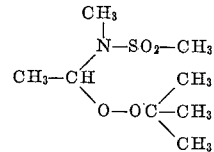

were obtained.

*Analysis.*—Calculated for $C_8H_{19}NO_4S$ (225.3): C, 42.7; H, 8.5; N, 6.22; S, 14.25. Found: C, 42.8; H, 8.7; N, 6.35; S, 15.2.

Molecular weight 215.

Example 10

8.2 grams of tetrahydronaphthalene hydroperoxide were dissolved in 30 cc. of dry ether, 6.75 grams of N-vinyl-N-methane sulfamide were added and at −20° C., 0.04 gram of sulfuryl chloride in diethyl ether was dropped in while stirring. After 15 minutes the crystalline reaction product precipitated. It was separated by suction filtration, washed first with saturated sodium bicarbonate solution and then with cooled ether and dried under reduced pressure. 9 grams of α[N-methyl-methanesulfamido] - ethyl-tetrahydronaphthalene peroxide were obtained having the formula

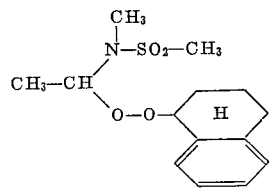

When the compound was recrystallized from acetone, it decomposed at 136° C.

*Analysis.*—Calculated for $C_{14}H_{21}NO_4S$ (299.4): C, 56.1; H, 7.1; N, 4.67; S, 10.7. Found: C, 55.35; H, 6.6; N, 5.0; S, 10.9.

Molecular weight 300.

Example 11

13.9 grams of N-vinyl-ε-caprolactam were dissolved in 20 cc. of dry diethyl ether, 9.2 grams of t-butyl hydroperoxide were added and 0.03 gram of sulfuryl chloride in dry ether was dropped into the mixture at 20–25° C. The solution was washed with dilute potassium hydroxide solution and water and dried over sodium sulfate. After having removed the ether 18.9 grams of α-N-caprolactamyl-ethyl-t-butyl peroxide of the formula

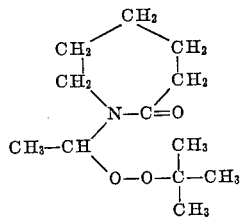

were obtained.

*Analysis.*—Calculated for $C_{12}H_{23}NO_3$ (229.3): C, 62.88; H, 10.13; N, 6.11. Found: C, 62.2; H, 10.4; H, 6.2.

Molecular weight 222.

We claim:

1. (α-N-methylacetamido)-ethyl-t-butyl peroxide of the formula

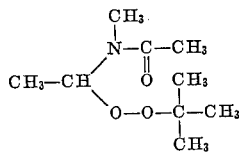

2. (α-N-ethylacetamido)-ethyl-t-butyl peroxide of the formula

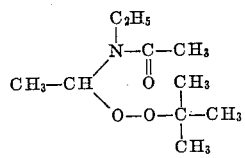

3. (α-pyrrolidonyl)-ethyl-t-butyl peroxide of the formula

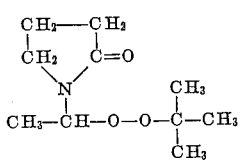

4. α[N - methyl - methane - sulfamido]-ethyl-t-butyl peroxide of the formula

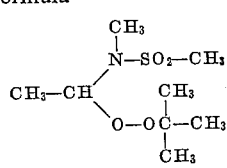

5. α - N - caprolactamyl-ethyl-t-butyl-peroxide of the formula

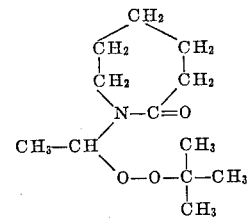

6. A process for preparing organic peroxides which comprises contacting an N-vinyl compound of the formula

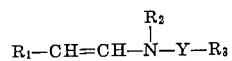

with a peroxide of the formula

in the presence of a catalyst selected from the group consisting of sulfuryl chloride, thionyl chloride, phosphorous oxychloride, low molecular weight aromatic sulfonic acids, hydrogen chloride, boron trifluoride, aluminum chloride, and aluminum bromide, and isolating from the reaction mixture peroxides of the formula

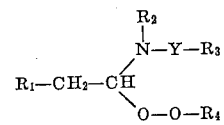

wherein Y is a member selected from the group consisting of $>C=O$ and $-SO_2-$, $R_1$ is a member selected from the group consisting essentially of hydrogen, saturated and olefinically unsaturated aliphatic, saturated cycloaliphatic, and aromatic hydrocarbyl having at most 12 carbon atoms, and saturated and olefinically unsaturated aliphatic, saturated cycloaliphatic, and aromatic hydrocarbyl having at most 12 carbon atoms and at least one peroxide-inert substituent selected from the group consisting of fluorine, chlorine, alkoxy, and nitro, $R_2$ and $R_3$ are selected from the group consisting of saturated and olefinically unsaturated aliphatic, saturated cycloaliphatic, and aromatic hydrocarbyl having at most 12 carbon atoms and saturated and olefinically unsaturated aliphatic, saturated cycloaliphatic, and aromatic hydrocarbyl having at most 12 carbon atoms and at least one peroxide-inert substituent selected from the group consisting of fluorine, chlorine, alkoxy, and nitro, where $R_2$ and $R_3$ may combine with the

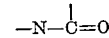

group when Y is $>C=O$ to form a member selected from the group consisting of 5 to 7 membered lactam rings and dicarboxylic acid imide rings, and wherein $R_4$ is a member selected from the group consisting of saturated aliphatic, saturated cycloaliphatic, and aromatic hydrocarbyl having at most 15 carbon atoms and tetrahydrofuryl.

7. A process as in claim 6 wherein said catalyst is present in an amount of from 0.001 to 2 percent.

8. A process as in claim 6 wherein said radical $R_4$ is tertiary hydrocarbyl.

9. A process as in claim 6 wherein the reactants are contacted in a solvent selected from the group consisting of hydrocarbons, ethers, and mixtures thereof.

10. A process as in claim 6 wherein the reactants are contacted at a temperature of from −100° C. to 100° C.

11. A process as in claim 6 wherein the reactants are contacted with the exclusion of water.

12. A process as in claim 6 wherein $R_1$ is hydrogen and $R_2$ and $R_3$ are hydrocarbyl having at most 12 carbon atoms.

13. A peroxide of the formula

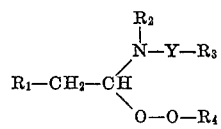

wherein Y is a member selected from the group consisting of $>C=O$ and $-SO_2-$, $R_1$ is a member selected from the group consisting essentially of hydrogen, saturated and olefinically unsaturated aliphatic, saturated cycloaliphatic, and aromatic hydrocarbyl having at most 12 carbon atoms, and saturated and olefinically unsaturated aliphatic, saturated cycloaliphatic and aromatic hydrocarbyl having at most 12 carbon atoms and at least one peroxide-inert substituent selected from the group consisting of fluorine, chlorine, alkoxy, and nitro, $R_2$ and $R_3$ are selected from the group consisting of saturated and olefinically unsaturated aliphatic, saturated cycloaliphatic, and aromatic hydrocarbyl having at most 12 carbon atoms and saturated and olefinically unsaturated aliphatic, saturated cycloaliphatic and aromatic hydrocarbyl having at most 12 carbon atoms and at least one peroxide-inert substituent selected from the group consisting of fluorine, chlorine, alkoxy and nitro, where $R_2$ and $R_3$ may combine with the

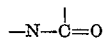

group when Y is $>C=O$ to form a member selected from the group consisting of 5 to 7 membered lactam rings and dicarboxylic acid imide rings, and wherein $R_4$ is a member selected from the group consisting of saturated aliphatic, saturated cycloaliphatic, and aromatic hydrocarbyl having at most 15 carbon atoms and tetrahydrofuryl.

14. A peroxide as in claim 13 wherein $R_1$ is hydrogen, $R_2$ and $R_3$ are hydrocarbyl, and $R_4$ is tertiary hydrocarbyl.

15. A peroxide as in claim 13 wherein $R_1$ is hydrogen, Y is $>C=O$, $R_3$ and $R_4$ together with the

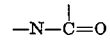

group form a 5 to 7 membered lactam ring, and $R_4$ is tertiary hydrocarbyl.

References Cited

Moeller: "Inorganic Chemistry," pp. 326-9, Wiley, 1952.

WALTER A. MODANCE, *Primary Examiner.*

NICHOLAS S. RIZZO, *Examiner.*

ROBERT BOND, *Assistant Examiner.*